US009462006B2

(12) United States Patent
Uzun et al.

(10) Patent No.: US 9,462,006 B2
(45) Date of Patent: Oct. 4, 2016

(54) NETWORK-LAYER APPLICATION-SPECIFIC TRUST MODEL

(71) Applicant: Palo Alto Research Center Incorporated, Palo Alto, CA (US)

(72) Inventors: Ersin Uzun, Campbell, CA (US); Christopher A. Wood, Newport Beach, CA (US); Marc E. Mosko, Santa Cruz, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 136 days.

(21) Appl. No.: 14/602,128

(22) Filed: Jan. 21, 2015

(65) Prior Publication Data

US 2016/0212148 A1    Jul. 21, 2016

(51) Int. Cl.
*H04L 29/06* (2006.01)
*G06F 21/51* (2013.01)

(52) U.S. Cl.
CPC ............ *H04L 63/123* (2013.01); *G06F 21/51* (2013.01); *H04L 63/126* (2013.01); *H04L 63/20* (2013.01)

(58) Field of Classification Search
CPC .............................. H04L 63/20; H04L 63/123
USPC .......................................................... 726/30
See application file for complete search history.

(56) References Cited

U.S. PATENT DOCUMENTS

| 817,441 A | 4/1906 | Niesz |
|---|---|---|
| 4,309,569 A | 1/1982 | Merkle |
| 4,921,898 A | 5/1990 | Lenney |
| 5,070,134 A | 12/1991 | Oyamada |
| 5,110,856 A | 5/1992 | Oyamada |
| 5,506,844 A | 4/1996 | Rao |
| 5,629,370 A | 5/1997 | Freidzon |
| 5,870,605 A | 2/1999 | Bracho |

(Continued)

FOREIGN PATENT DOCUMENTS

| DE | 1720277 A1 | 6/1967 |
|---|---|---|
| DE | 19620817 A1 | 11/1997 |

(Continued)

OTHER PUBLICATIONS

Xie et al. "Collaborative Forwarding and Caching in Content Centric Networks", Networking 2012.

(Continued)

*Primary Examiner* — Hadi Armouche
*Assistant Examiner* — Shahriar Zarrineh
(74) *Attorney, Agent, or Firm* — Shun Yao; Park, Vaughan, Fleming & Dowler LLP

(57) ABSTRACT

A data verification system facilitates verifying whether a CCN Content Object is authentic or trustworthy on behalf of an application. During operation, the system can obtain a stack requirement for a custom transport stack, which specifies at least a description for a verifier stack component that verifies a Content Object using a key identifier (KeyID) associated with a publisher. The system instantiates the verifier stack component in the custom stack, and can use the custom stack to obtain a verified Content Object. While using the custom stack, the system can push, to the custom stack, an Interest that includes a name for a piece of content and includes a KeyID associated with a content producer. The system then receives, from the custom stack, a Content Object which the verifier stack component has verified is signed by the content producer associated with the KeyID.

22 Claims, 8 Drawing Sheets

(56) References Cited

U.S. PATENT DOCUMENTS

| | | |
|---|---|---|
| 6,052,683 A | 4/2000 | Irwin |
| 6,091,724 A | 7/2000 | Chandra |
| 6,173,364 B1 | 1/2001 | Zenchelsky |
| 6,226,618 B1 | 5/2001 | Downs |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,903,756 B2 | 12/2014 | Zhao |
| 8,937,865 B1 | 1/2015 | Kumar |
| 9,071,498 B2 | 6/2015 | Beser |
| 9,112,895 B1 | 8/2015 | Lin |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Paterka |
| 2004/0024879 A1 | 2/2004 | Dingman |
| 2004/0030602 A1 | 2/2004 | Rosenquist |
| 2004/0039827 A1* | 2/2004 | Thomas ............... H04L 29/06 709/228 |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |

(56) References Cited

U.S. PATENT DOCUMENTS

| | | |
|---|---|---|
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166806 A1* | 6/2012 | Zhang .................. H04L 9/3247 713/176 |
| 2012/0179653 A1 | 7/2012 | Araki |
| 2012/0197690 A1 | 8/2012 | Agulnek |
| 2012/0198048 A1 | 8/2012 | Ioffe |
| 2012/0204224 A1* | 8/2012 | Wang .................. H04L 67/2819 726/3 |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |

(56) References Cited

U.S. PATENT DOCUMENTS

| | | |
|---|---|---|
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1* | 10/2013 | Zhang ............... H04L 45/74 709/238 |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |
| 2016/0014234 A1* | 1/2016 | Oran ............... H04L 45/742 709/203 |
| 2016/0043963 A1* | 2/2016 | Oran ............... H04L 47/722 370/231 |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Afanasyev, Alexander, et al. "Interest flooding attack and countermeasures in Named Data Networking." IFIP Networking Conference, 2013. IEEE, 2013.

Cho, Jin-Hee, Ananthram Swami, and Ray Chen. "A survey on trust management for mobile ad hoc networks." Communications Surveys & Tutorials, IEEE 13.4 (2011): 562-583.

Compagno, Alberto, et al. "Poseidon: Mitigating interest flooding DDoS attacks in named data networking." Local Computer Networks (LCN), 2013 IEEE 38th Conference on. IEEE, 2013.

Conner, William, et al. "A trust management framework for service-oriented environments." Proceedings of the 18th international conference on World wide web. ACM, 2009.

Fayazbakhsh, S. K., Lin, Y., Tootoonchian, A., Ghodsi, A., Koponen, T., Maggs, B., & Shenker, S. (Aug. 2013). Less pain, most of the gain: Incrementally deployable ICN. In ACM SIGCOMM Computer Communication Review (vol. 43, No. 4, pp. 147-158). ACM.

Gasti, Paolo, et al. "Dos and ddos in named data networking." Computer Communications and Networks (ICCCN), 2013 22nd International Conference on. IEEE, 2013.

Ghali, Cesar, Gene Tsudik, and Ersin Uzun. "Needle in a Haystack: Mitigating Content Poisoning in Named-Data Networking." Proceedings of NDSS Workshop on Security of Emerging Networking Technologies (SENT). 2014.

Ghodsi, Ali, et al. "Naming in content-oriented architectures." Proceedings of the ACM SIGCOMM workshop on Information-centric networking. ACM, 2011.

Ghodsi, Ali, et al. "Information-centric networking: seeing the forest for the trees." Proceedings of the 10th ACM Workshop on Hot Topics in Networks. ACM, 2011.

Koponen, Teemu, et al. "A data-oriented (and beyond) network architecture." ACM SIGCOMM Computer Communication Review. vol. 37. No. 4. ACM, 2007.

Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.

Lopez, Javier, et al. "Trust management systems for wireless sensor networks: Best practices." Computer Communications 33.9 (2010): 1086-1093.

Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.

Zahariadis, Theodore, et al. "Trust management in wireless sensor networks." European Transactions on Telecommunications 21.4 (2010): 386-395.

Jacobson, Van et al., "Content-Centric Networking, Whitepaper Describing Future Assurable Global Networks", Palo Alto Research Center, Inc., Jan. 30, 2007, pp. 1-9.

Koponen, Teemu et al., "A Data-Oriented (and Beyond) Network Architecture", SIGCOMM '07, Aug. 27-31, 2007, Kyoto, Japan, XP-002579021, p. 181-192.

(56) References Cited

OTHER PUBLICATIONS

Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
B. Lynn$2E.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—Asiacrypt 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D. Boneh, C. Gentry, and B. Waters, 'Collusi.
D. Boneh and M. Franklin. Identity-Based Encryption from the Weil Pairing. Advances in Cryptology—Crypto 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
G. Ateniese, K. Fu, M. Green, and S. Hohenberger. Improved Proxy Reencryption Schemes with Applications to Secure Distributed Storage. In the 12th Annual Network and Distributed System Security Sympo.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Gupta, Anjali, Barbara Liskov, and Rodrigo Rodrigues. "Efficient Routing for Peer-to-Peer to-Peer Overlays." NSDI. vol. 4. 2004.
H. Xiong, X. Zhang, W. Zhu, and D. Yao. CloudSeal: End-to$2.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hogue et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

(56) References Cited

OTHER PUBLICATIONS

J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Sciencevolume 5443 (2009).
V. Jacobson et al., 'Networking Named Content,' Proc. IEEE CoNEXT '09, Dec. 2009.
Jacobson, Van et al. 'VoCCN: Voice Over Content-Centric Networks.' Dec. 1, 2009. ACM ReArch'09.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
M. Blaze, G. Bleumer, and M. Strauss, 'Divertible protocols and atomic prosy cryptography,' in Proc. Eurocrypt 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matted Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. Inc 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
Rosenberg, J. "Interactive Connectivity Establishment (ICE): A Protocol for Network Address Translator (NAT) Traversal for Offer/Answer Protocols", Apr. 2010, pp. 1-117.
S. Chow, J. Weng, Y. Yang, and R. Deng. Efficient Unidirectional Proxy Re-Encryption. Progress in Cryptology—Africacrypt 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shih, Eugene et al., 'Wake on Wireless: An Event Driven Energy Saving Strategy for Battery Operated Devices', Sep. 23, 2002, pp. 160-171.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.

(56) References Cited

OTHER PUBLICATIONS

T. Dierts, "The transport layer security (TLS) protocol version 1.2," IETF RFC 5246, 2008.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Miniconference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digital Rights Management using Broadcast Encryption. Proceedings of the IEEE 92.6 (2004).
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.

* cited by examiner

NETWORK-LAYER APPLICATION-SPECIFIC TRUST MODEL

RELATED APPLICATION

The subject matter of this application is related to the subject matter of the following applications:

U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008;

U.S. patent application Ser. No. 13/847,814, entitled "ORDERED-ELEMENT NAMING FOR NAME-BASED PACKET FORWARDING," by inventor Ignacio Solis, filed 20 Mar. 2013 and U.S. patent application Ser. No. 14/337,026, entitled "System for Distributing Nameless Objects using Self-Certifying Names," by inventor Marc E. Mosko, filed 21 Jul. 2014;

the disclosures of which are incorporated by reference in their entirety herein.

BACKGROUND

1. Field

This disclosure is generally related to Content Centric Networks. More specifically, this disclosure is related to a security component of a transport stack that verifies a Content Object on behalf of an application.

2. Related Art

The proliferation of mobile computing and cellular networks is making digital content more mobile than ever before. People can use their smartphones to generate content, to consume content, or even to provide Internet access to other computing devices that generate or consume content. Oftentimes, a device's network location can change as a person takes this device to a new physical location. This can make it difficult to communicate with this device under a traditional computer network (e.g., the Internet) when the device's new network location is not known.

To solve this problem, information centric network (ICN) architectures have been designed to facilitate accessing digital content based on its name, regardless of the content's physical or network location. Content centric networking (CCN) is one example of an ICN. Unlike traditional networking, such as Internet Protocol (IP) networks where packets are forwarded based on an address for an end-point, the CCN architecture assigns a routable name to content itself so the that content can be retrieved from any device that hosts the content.

A typical CCN architecture forwards two types of packets: Interests and Content Objects. Interests include a name for a piece of named data, and serve as a request for the piece of named data. Content Objects, on the other hand, typically include a payload, and are only forwarded along a network path that has been traversed by an Interest with a matching name, and traverse this path in the reverse direction taken by the Interest packet. Typical CCN architectures only send Content Objects as a response to an Interest packet; Content Objects are not sent unsolicited.

CCN architectures can ensure content authenticity by allowing publishers to sign content, which allows consumers to verify content signatures. However, typical CCN routers do not perform content signature verification on Content Objects to avoid incurring additional network latency. Some CCN routers also maintain a Content Store that caches content to minimize the round-trip-delay, by returning a cached Content Object whenever possible. However, content caching in routers opens the door for denial-of-service (DoS) attacks.

One such DoS attack involves content poisoning, where an adversary injects fake content into a router's cache to flood the CCN network with fake content that blocks access to legitimate content of the same name. Applications can avoid becoming victim to content poisoning attacks by enforcing the use of self-certifying content names, or by verifying that the returned Content Objects is signed by a trusted entity. However, this is only possible if the application knows the content's hash value ahead of time, or has access to a set of digital certificates that bind the Content Object to a trusted entity. Implementing client applications that enforce CCN security measures can increase the complexity of client applications, which can require the application's developer or local user to maintain an up-to-date set of trusted root certificates that can be used to verify Content Objects. Hence, implementing client applications that enforce CCN security measures can require significant development costs and on-going maintenance costs for the developer and the user.

SUMMARY

One embodiment provides a data verification system that facilitates verifying, on behalf of an application, whether a CCN Content Object is authentic or trustworthy. During operation, the system can obtain a stack requirement for a custom transport stack, which specifies at least a description for a verifier stack component that verifies Content Objects using publisher key identifiers (KeyIDs). The system instantiates the verifier stack component in the custom stack based on the stack requirement, and can use the custom stack to obtain a verified Content Object that has been verified by the verifier stack component. While using the custom stack, the system can push, to the custom stack, an Interest that includes a name for a piece of content and includes a KeyID associated with a content producer. The system then receives, from the custom stack, a Content Object which the verifier stack component has verified to be signed by the content producer associated with the KeyID.

In some embodiments, the verifier stack component can verify Content Objects or Named Data Objects (NDO's) received over an Information Centric Network (ICN) or a Content Centric Network (CCN). In ICNs, each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. Named-data networks (NDN) or content-centric networks (CCN) are examples of an ICN architecture; the following terms describe elements of an NDN or CCN architecture:

Content Object:

A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names:

A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ndn, and test.txt can be structured in a left-oriented prefix-major fashion to form the name "/parc/home/ndn/test.txt." Thus, the name "/parc/home/ndn" can be a "parent" or "prefix" of "/parc/home/ndn/test.txt." Additional components can be used to distinguish between different versions of the content item, such as a collaborative document.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest:

A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

In some embodiments, the ICN system can include a content-centric networking (CCN) architecture. However, the methods disclosed herein are also applicable to other ICN architectures as well. A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

In some embodiments, the system can process a Content Object using the verifier stack component of the custom stack. While processing the Content Object, the system can use a verifier module to verify whether Content Object is signed by the content producer associated with the KeyID. Then, responsive to determining that the verifier module does not validate or invalidate the Content Object, the system processes the Content Object using one or more trust checkers to determine whether the Content Object is trustworthy.

In some variations to these embodiments, the system accepts the Content Object responsive to determining that at least one trust checker has determined the Content Object to be trustworthy.

In some variations to these embodiments, the system rejects the Content Object responsive to determining that at least one trust checker has determined the Content Object to not be trustworthy.

In some embodiments, the description of the verifier stack component includes a list of trusted certificate authorities.

In some embodiments, the description of the verifier stack component includes a listing of one or more trust checkers to instantiate in the verifier stack component. A respective trust checker can analyze a Content Object to accept the Content Object, reject the Content Object, or defer verification of the Content Object to another trust checker.

In some embodiments, the description of the verifier stack component includes an ordering for the one or more trust checkers in the verifier stack component.

In some embodiments, the description of the verifier stack component includes an implementation for a respective trust checker.

In some variations to these embodiments, the set of trust checkers can include a trust checker that rejects Content Objects with stale data.

In some variations to these embodiments, the set of trust checkers can include a trust checker that rejects a public key which is not published under a white-list name prefix.

In some variations to these embodiments, the set of trust checkers can include a trust checker which verifies a Content Object using a Pretty Good Privacy (PGP) web of trust.

In some embodiments, the system can receive, from an application, a control statement for the custom stack. The control statement includes a set of trust checkers to enable in the verifier stack component. The system then enables the set of trust checkers responsive to receiving the control statement.

In some embodiments, the system can receive, from an application, a control statement for the custom stack. The control statement can include a set of trust checkers to disable in the verifier stack component. The system then disables the set of trust checkers responsive to receiving the control statement.

BRIEF DESCRIPTION OF THE FIGURES

In the figures, like reference numerals refer to the same figure elements.

DETAILED DESCRIPTION

Figure 1:
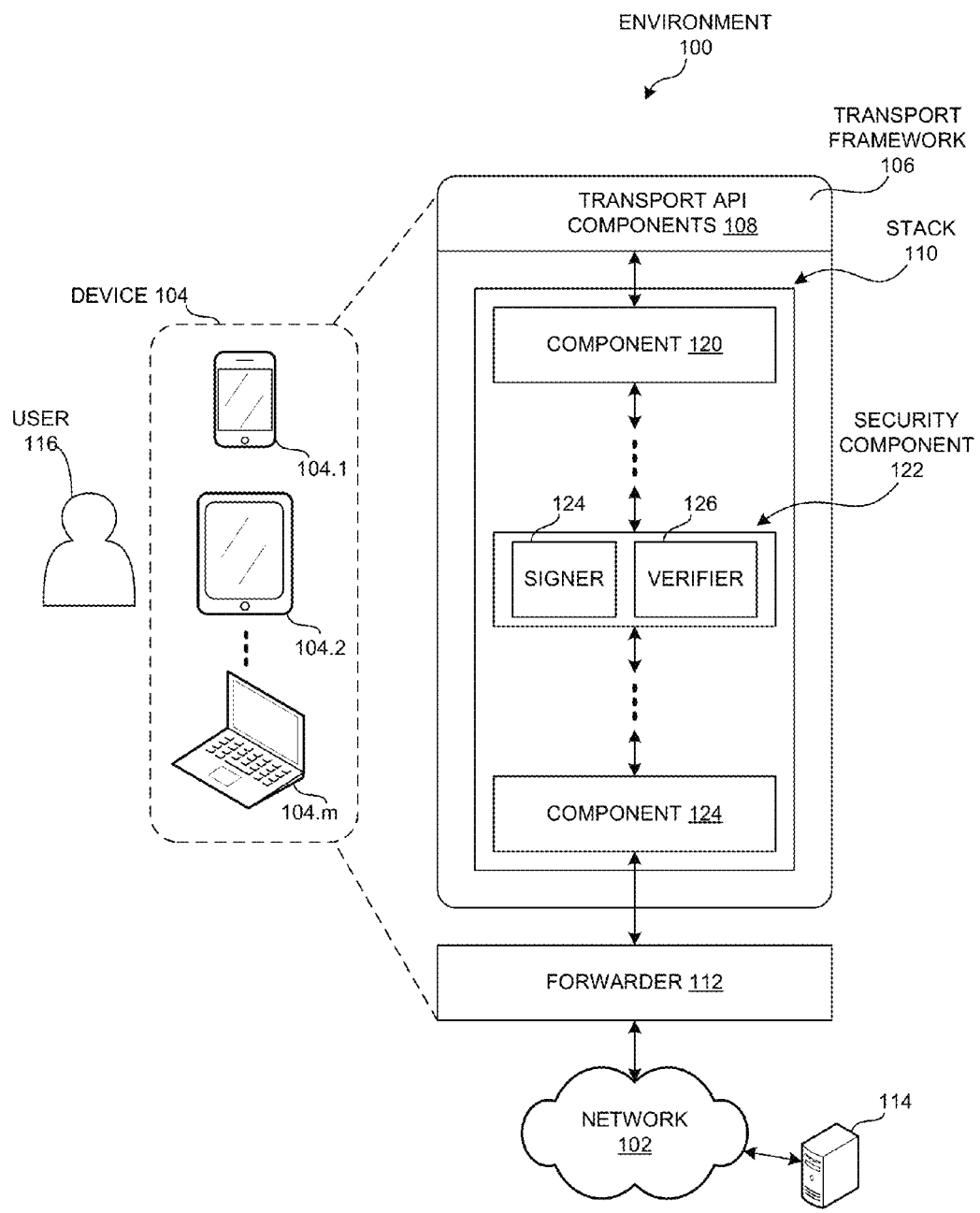
FIG. 1 presents an exemplary computing environment that facilitates receiving verified Content Objects in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a security stack component that solves the problem of verifying, on behalf of an application, whether a CCN Content Object is authentic or trustworthy. The verifier stack component can be instantiated within a stack of the transport framework, and performs transparent enforcement of the trust on behalf of the application or operating environment, without requiring the application or operating environment to be involved in verifying the Content Object.

For example, an Interest message can facilitate verifying a Content Object by specifying a public key of a content producer or specifying a self-certifying name for the Content Object. The self-certifying name can include an exact hash digest of the Content Object, and can be obtained, for example, from a Content Object Manifest that references a collection of data. Any entity that disseminates or forwards the Interest can use the public key or the self-certifying name to determine a trustworthiness of a Content Object received as a response to the Interest. If the entity knows the self-certifying name of the Content Object, this entity may not need to verify the signature of their corresponding Content Object; the entity may just compute and compare the Content Object's hash value to the self-certifying name.

In some embodiments, if the client wants to obtain a secure Content Object, the client can disseminate an Interest that includes a key identifier (KeyID) associated with the Content Object's content producer, and/or includes a ContentObjectHash field with the Content Object's hash. The KeyID is a hash of a public key for the content producer. When the network stack receives such an Interest, the verifier component of the network stack can use the KeyID and/or the ContentObjectHash fields to verify the authenticity and legitimacy of Content Objects with.

An application can use a transport stack on the local computer to disseminate the Interest for the Content Object, and expects to receive a verified Content Object that was indeed published by the content producer associated with the KeyID. The transport stack disseminates the Interest, and the verifier component can use the Interest's KeyID to verify the signature of the Content Object it receives to make sure the Content Object was signed by the trusted content producer.

To verify the Content Object, the verifier component needs to have access to the public key required to verify the Content Object, either from a local keychain or from a trusted third party (e.g., a certificate authority). Also, to make sure the public key is valid, the verifier component computes the hash of the public key, and compares this hash to the KeyID. The public key is valid if the public key's hash matches the KeyID.

Hence, the verifier component of the transport stack implements a generalized trust model that can be bootstrapped or configured at runtime to implement any application-specific trust model. This verifier component allows application developers to implement any robust and unique trust models that satisfy their application's need, can leverage absolute trust anchors (e.g., a certification authority identity and public key).

Exemplary Network Environment

In CCN, a forwarder maintains a forwarder information base (FIB) to control how Interests are forwarded across the CCN, maintains a pending Interest table (PIT) to return Content Objects along a return path established by the corresponding Interest, and maintains a content store (CS) to cache Content Objects. With the addition of content-restriction fields such as the KeyID and the ContentObjectHash values, the forwarder can operate on upstream Interests as follows:

1) The forwarder performs exact-name matching to search through the CS for content that matches the Interest's name. If a match is found, the cached content is returned to satisfy the Interest.
2) If the CS search results in a miss, the forwarder searches through the PIT for an entry with the same Interest name. If a matching PIT entry is found, the forwarder aggregates the Interest to the PIT entry, and records the arrival time and interface in the PIT entry, without having to forward the Interest.
3) If there is a CS miss and PIT miss, the forwarder creates a new PIT entry for the Interest, and records the arrival time and interface in the PIT entry. The forwarder then performs a longest-prefix matching lookup in the FIB for an output interface upon which to forward the Interest. If there exists multiple matching FIB entries, the forwarder's the internal scheduler prioritizes the routes as needed. The forwarder can use secondary routes, for example, if an Interest times out on the first, highest priority route.

For downstream Content Objects, the forwarder uses information in the PIT and CS to determine if the Content Object can be satisfied by any entry in the PIT. With the addition of fields such as KeyID and ContentObjectHash in interest messages, the forwarder limits objects which can be returned by the following rules:

1) The forwarder discards the Content Object if the hash digest of the public key used to verify the signature of a Content Object does not match the digest provided in the KeyID field of the corresponding interest.
2) The forwarder discards the Content Object if the hash of the Content Object does not match the digest provided in the ContentObjectHash field.

If the forwarder does not discard the Content Object, the forwarder searches for a PIT entry with a matching name. If a matching PIT entry is found, the forwarder sends the Content Object message to the downstream Interface upon which the Interest arrived, and can also cache the Content Object in the CS.

The CCN architecture also supports Manifest objects to encapsulate metadata for large chunks of content, as well as security and access control information. Manifest Content Objects have names that match the Interest, and can include a list of self-certifying Interest names (SCNs) for other pieces of content (e.g., for chunks of a large content file). Since the Manifest object is itself a Content Object and carries a signature, the list of SCNs can be trusted and used to issue a large number of interests with SCNs in parallel, thereby increasing throughput and removing the need for signature verification. A description of Manifests is described in U.S. patent application Ser. No. 14/337,026, entitled "System for Distributing Nameless Objects using Self-Certifying Names," by inventor Marc E. Mosko, filed 21 Jul. 2014), which is hereby incorporated by reference.

Any device that disseminates an Interest for a Content Object can use the KeyID and/or the ContentObjectHash value. In embodiments of the present invention, the transport framework can verify a Content Object on behalf of an application that disseminated the corresponding Interest.

FIG. 1 presents an exemplary computing environment 100 that facilitates receiving verified Content Objects in accordance with an embodiment. Computing environment 100 can include a content centric network (CCN) 102, which can include any combination of wired and wireless networks, such as a Wi-Fi network, a cellular network, an Ethernet network, a fiber-optic network, and the Internet. CCN 102 can include a plurality of forwarders (e.g., routers and member computer nodes) that can forward Interests and Content Objects based on their name or name prefix. Computing environment 100 can also include a client 104 connected to CCN 102, such as a smartphone 104.1, a tablet computer 104.2, and/or a server or personal computer 104.m.

In the traditional IP architecture, a forwarder is an IP-based forwarder that looks at a packet's header to determine the source and the destination for the packet, and forwards the packet to the destination. The conventional stack performs TCP/UDP, and an application interacts with the stack via a socket. In contrast, device 104 of the present invention doesn't use such a conventional "stack." Rather, device 104 implements a "transport framework" 106 which can dynamically configure a custom stack to satisfy an application's custom "environment execution context."

Specifically, device 104 can include a transport framework 106 which can automatically create and/or update a custom stack 110 for a local application or the local operating environment (e.g., without intervention of a local user 116, the local operating environment, and/or any applications running on device 104). Device 104 can also include a forwarder 112 (e.g., a network interface card, or a router in a local area network), which can transfer packets between custom stacks of transport framework 106 and network 102. Custom stack 110 can process packets to and/or from forwarder 112 or any application running on device 104, and the stack's components can include any available components that can be organized in any order to satisfy the application's requirements.

In some embodiments, transport framework 106 can include a set of stack-configuring agents that can dynamically configure a stack on-demand. For example, transport framework 106 can include a set of transport API components 108 that implement functions accessible via a library and/or an API. An application can access an API implemented by transport framework 106 by issuing a call to transport framework 106. Transport framework 106 then maps the API call to a corresponding API component of components 108 that implements this specific function, and forwards the API call to this API component.

If a stack doesn't exist for processing the API call, the API component can configure or instantiates a custom stack that can perform the application's API call. For example, the API component can issue a request to transport framework 106, with a request describing the functionality of the custom stack. This functionality description can be high-level, such as to specify a pre-defined behavior or operation that is to be performed on data packets. Transport framework 106 then realizes this behavior or operation by organizing the necessary components into a custom stack 110 (e.g., in custom stack components) in an order that achieves the desired behavior or operation.

Alternatively, the functionality description can be low-level, such as to specify the specific stack components that are to be used, and can specify an order in which the stack components are to be arranged. Moreover, the functionality description can also be specific or generic with respect to the individual components, for example, to request a specific "security component" (e.g., a PKI verification component) or to request any "verification component."

Each component in custom stack 110 has a tuple of input and output queues, such as an OutputQueueDown queue and an InputQueueDown queue for sending and receiving messages to/from the next lower component in the stack, respectively. The input and output queues also include an OutputQueueUp queue and an InputQueueUp queue for sending and receiving messages to/from the next higher component in the stack, respectively. Egress messages flow through components of tack 110 one at a time through the downward queues (e.g., from component 120 toward component 124), where each component reads, processes, and forwards the messages as needed. Ingress messages, on the other hand, flow through the stack 110 upward from component 124 toward component 120. The top stack component 120 in stack 110 interfaces with transport API components 108, and the bottom stack component 124 interfaces with forwarder 112.

In some embodiments, stack 110 can include a security component 122 that performs transparent enforcement of the trust on behalf of the application or operating environment, without requiring the application or operating environment to be involved in verifying the Content Object. For example, security component 122 can include a signer component 124 and a verifier component 126. When security component 122 receives an Interest from an application, signer 124 can store the Interest in a local repository to make the Interest's KeyID or ContentObjectHash value accessible by the verifier 126.

Verifier 126 performs the operations to obtain the necessary public key associated with an Interest's KeyID, verifying the public key, and verifying the Content Object whose name prefix matches the Interest's name. Verifier 126 can perform a remedial action when a public key fails verification (e.g., by requesting another public key), and can perform a remedial action when a Content Object fails verification (e.g., by disseminating the Interest to request another Content Object that may pass verification).

In some embodiments, the Content Object can include a Manifest. Manifests include a listing of one or more Content Objects that are part of a larger collection, such as a movie file. The Manifest itself can also include a signature that can be used to verify the Manifest against a publisher's public key or KeyID. Also, the Manifest includes any other information that is necessary for verifying the Manifest, such as a reference to a certificate that includes the public key that was used to sign the Manifest. Verifier 126 can perform PKI verification by using this reference to fetch the certificate from a trusted third party, and determining whether security component 122 can trust the certificate (e.g., by following a chain of trust from a trusted root certificate to the Manifest's certificate).

If verification of the Manifest's certificate is successful, verifier 126 obtains the public key from the certificate, and verifies the public key using the KeyID. If verification of the public key is successful, verifier 126 uses the public key to verify the Manifest's signature. If the Manifest's signature is successful, verifier 126 proceeds to send the Manifest to a higher stack component in transport stack 110 (e.g., to a Manifest-handling stack component, or to the application or operating environment that requested the Manifest).

Verifier 126 also includes a trust circuit that can verify the Content Object based on additional attributes of the Content Object. For example, if PKI verification cannot be used to accept or reject the Content Object (e.g., if verifier 126 cannot obtain the KeyID, the public key, or a certificate), verifier 126 can defer verification to the trust circuit. This trust circuit implements more complex trust verification techniques that are beyond the standard PKI verification framework. For example, the trust circuit can include a sequence of trust checkers that can be defined by the application or the operating environment via the transport framework API.

Some example trust checks can include:
- A trust checker that rejects stale data (e.g., data older than n days)
- A trust checker that rejects Content Objects whose public key is obtained from a namespace not in a namespace whitelist or from a namespace in a namespace blacklist
- A trust checker that validates Content Objects using a Pretty Good Privacy (PGP) peer web of trust.

In some embodiments, the application or the operating environment can provide the instructions that implement a trust checker to the API 108 of Transport Framework 106 when instantiating security component 122 in custom stack 110. The application can also provide a list of pre-defined checkers to instantiate for the trust circuit, and can provide an order in which these trust checkers are to be instantiated in security component 122.

Verifier 126 can include a Control Point Interface (CPI) agent, which accepts control statements from the application at runtime. The application can use the CPI to select, at runtime, which subset of trust checkers the application wants to enable or disable for a given Interest (and the matching Content Object), or for any future Interests and Content Objects. Hence, when a trust checker is turned off, the trust circuit can bypass the trust checker to forward all checks onto the next trust checker in the sequence of trust checkers.

Figure 2:
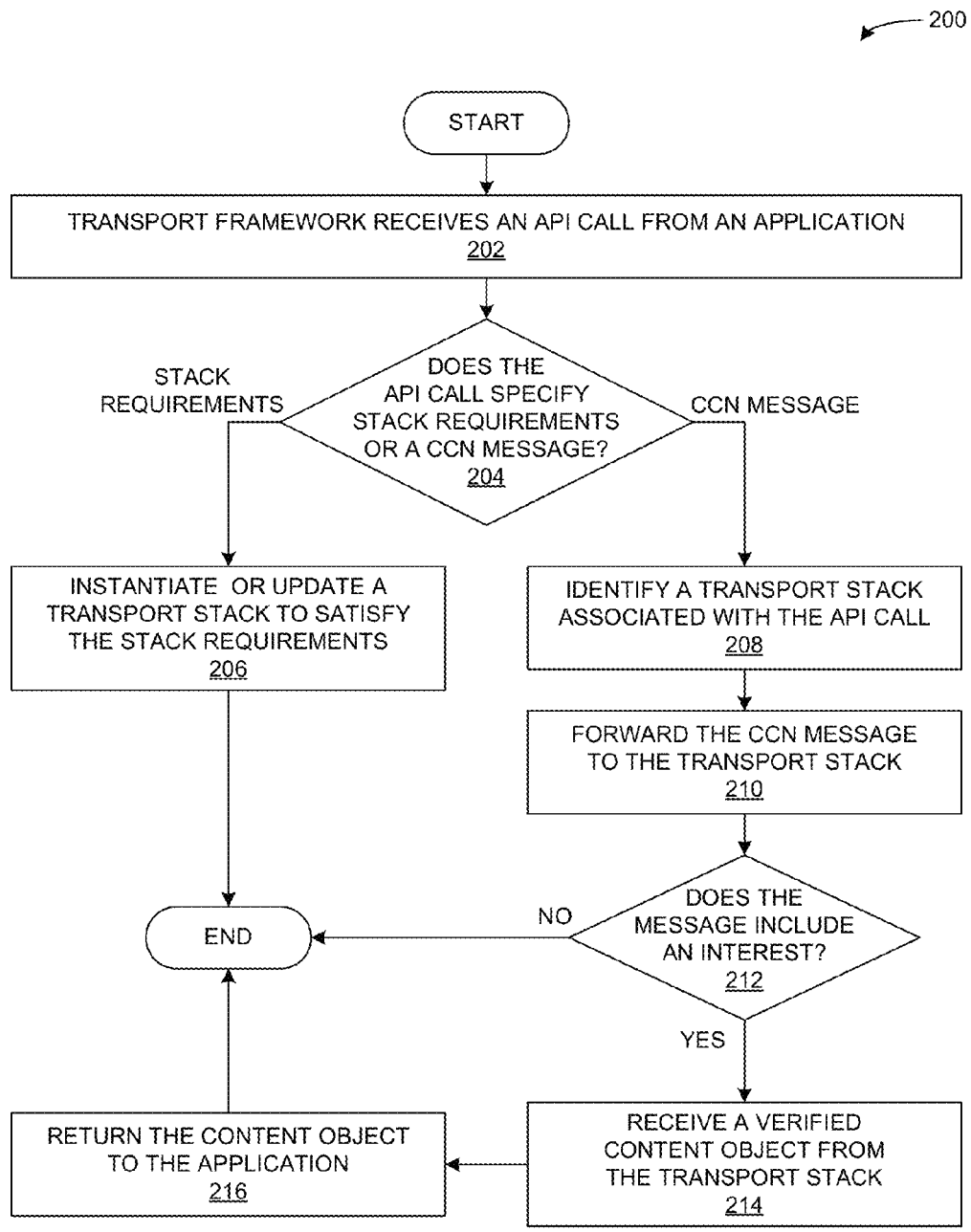
FIG. 2 presents a flow chart illustrating a method for instantiating or using a transport stack to receive verified Content Objects in accordance with an embodiment.

FIG. 2 presents a flow chart illustrating a method 200 for instantiating or using a transport stack to receive verified Content Objects in accordance with an embodiment. During operation, the transport framework can receive an API call from an application (operation 202). This API call can include instructions to instantiate or update a stack that is to be used by the application, or can include messages which the application needs to transmit over the computer network. Hence, the transport framework determines whether the API call includes stack requirements, or includes a CCN message (operation 204). If the API call includes stack requirements, the transport framework instantiates or updates a transport stack so that it satisfies the stack requirements (operation 206).

On the other hand, if the API call includes a CCN message, the transport framework identifies a transport stack associated with the API call (operation 208), and forwards the CCN message to the identified transport stack (operation 210). Also, recall that a CCN message may include an Interest that serves as a request for a piece of data, or may include a data object that carries data for the local application (e.g., a CCN Content Object that includes data requested via an Interest). Hence, the transport framework may analyze the CCN message to determine whether the message includes an Interest (operation 212). If so, the transport framework may receive a verified Content Object from the transport stack (operation 214), which was verified by the verifier component of the transport stack. The transport framework then returns the verified Content Object to the application (operation 216).

During operation 206, when instantiating the transport stack, the application or the transport framework can bootstrap the verifier component to uphold a desired trust model. For example, a local web browser can be preconfigured with a set of root Certificate Authority (CA) certificates which the browser can use to validate the signed data it receives. The web browser can instantiate a custom transport stack that includes the verifier component, and bootstraps the verifier component to include this set of root CA certificates. Then, when establishing TLS sessions over HTTPS, the verifier can traverse the certificate chain starting at the target server and ending with a trusted CA certificate, which validates the legitimacy of the public-key used to encrypt and/or sign the data. If the target server's certificate chain is not rooted in one of the default root CA certificates, then the public key is not trusted, and the user is typically alarmed. The browser application no longer needs to traverse the certificate chain itself to validate signed or encrypted data packets.

Recall that the stack components can include a Control Plane Interface (CPI) that serves to configure components in the transport stack. In some embodiments, the local application can use the CPI to issue a CPI call directly to the security component or verifier component, to send configuration information that reconfigures or updates the trust model of the verifier component. The CPI call can include a CCN message can encapsulate JSON-encoded commands, and is sent asynchronously from the CPI to the target stack component (e.g., the security component or the verifier component) to modify the stack component's internal state.

The command in the CCN message includes an object with a command identifier (string) and payload (options) for the command. For example, to cancel a flow controller session for a particular namespace prefix, a JSON-encoded command wrapped in a CCN Message is sent to the Flow-Controller component. An exemplary JSON-encoded CPI command is presented in Table 1.

TABLE 1

```
{
  CMD      : "CONTROLFLOW_CANCEL_FLOW",
  PAYLOAD : {
    flow-name : <flowname>
  }
}
```

When the transport framework receives a CPI call, the transport framework can asynchronously invoke the CPI event handler (CPI agent) that parses the CCN Message instance, extracts the command identifier and associated options payload from the JSON object, and performs a lookup to identify a stack component that has registered itself with the command identifier. The CPI event handler then forwards the CCN Message instance to the matching stack component that performs the command's operation (e.g., to cancel the flow session).

In some embodiments, the verifier component can register CPI commands with the CPI event handler. Two exemplary commands include a whitelist modification command and a blacklist modification command. The whitelist command (or blacklist command) can add (remove) a whitelist source and remove (add) a blacklist source from the trust circuit gate in the verifier component of the stack. The options payload for a whitelist command or a blacklist command can include a set of keys, and has for each key a list of namespace prefixes that are to be added or removed to/from the whitelist source or blacklist source.

In some embodiments, the default behavior for the last gate in the trust circuit may be set to automatically reject messages, since they have not been verified by any of the prior gates. However, application developers may wish to negate this behavior to be more trustworthy. Another exemplary CPI command registered by the verifier component can include a "set trust circuit end-gate defer action" command that configures the default behavior of the last trust checker in the verifier component's trust circuit.

Yet another exemplary command registered by the verifier component can include a "toggle advanced trust circuit gates" that enables or disables the trust circuit in the verifier component. When enabled, the verifier component forwards incoming messages into the test circuit if they pass the basic trust policy test. If disabled, only the basic trust policy test will be enforced and the verifier component does not forward messages to the trust circuit.

Network-Layer Security Component

Figure 3:
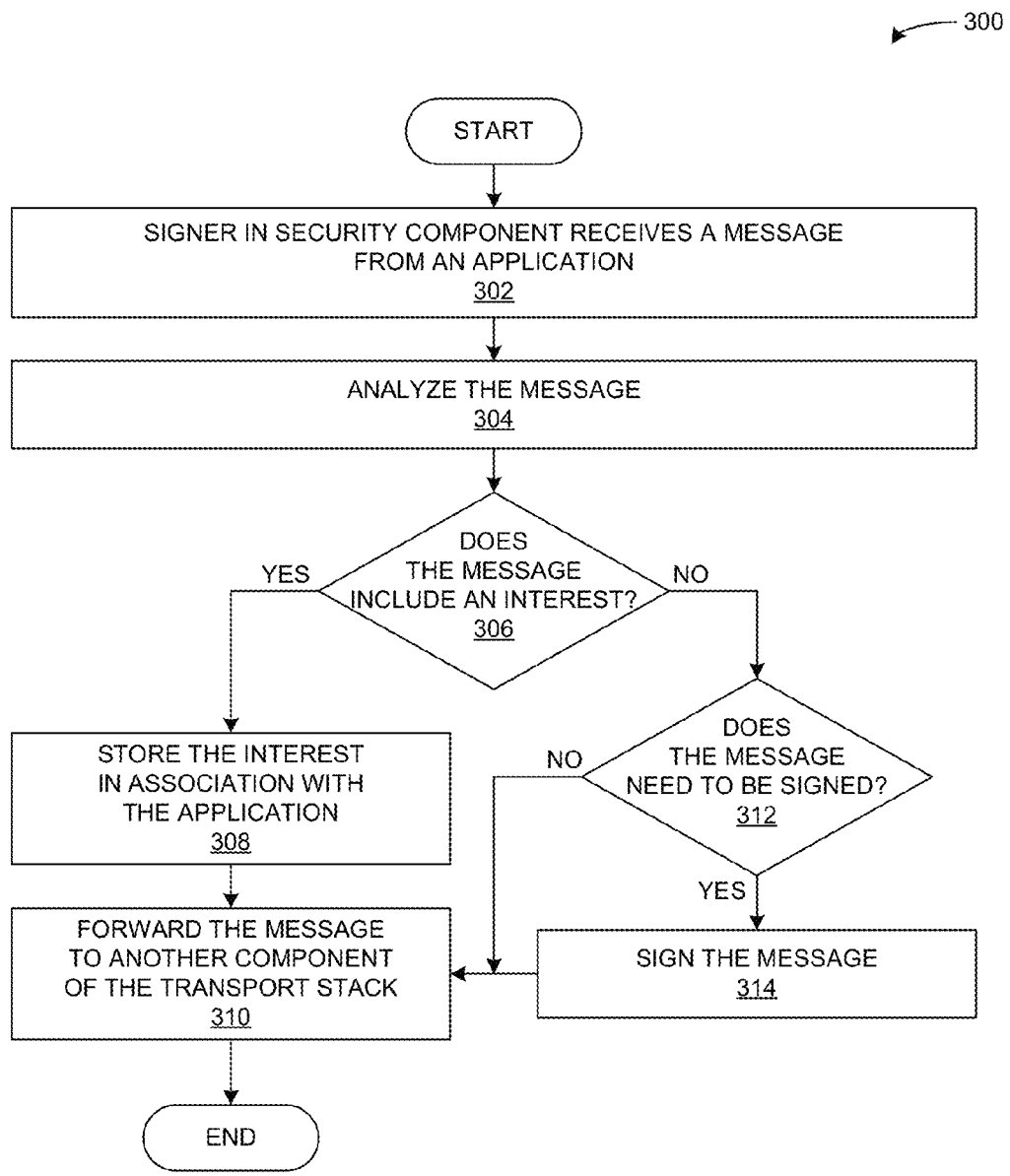
FIG. 3 presents a flow chart illustrating a method for using a security component of a transport stack to send messages over a Content Centric Network in accordance with an embodiment.

FIG. 3 presents a flow chart illustrating a method 300 for using a security component of a transport stack to send messages over a Content Centric Network in accordance with an embodiment. During operation, a signer component of the security component can receive a message from an application (operation 302), and analyzes the message to determine its contents (operation 304).

Recall that an application can disseminate an Interest that includes a KeyID to request a Content Object which has been signed by an entity associated with the KeyID. For this reason, the security component stores Interest messages so that the security component can access their KeyID when verifying their matching Content Objects. Hence, while analyzing the message, the signer determines whether the message includes an Interest (operation 306), and if so, the signer can store the Interest in association with the application (operation 308). The signer then forwards the message to another component of the transport stack (operation 310).

On the other hand, if the message does not includes an Interest (e.g., the message include Content Object, or any other data object that needs to be transmitted over the computer network), the signer determines whether the message needs to be signed (operation 312). If the message does not need to be signed, the signer proceeds to forward the message to the next component of the transport stack (operation 310). Otherwise, the signer proceeds to sign the message (operation 314) before forwarding the message to the next component of the transport stack (operation 310).

Figure 4:
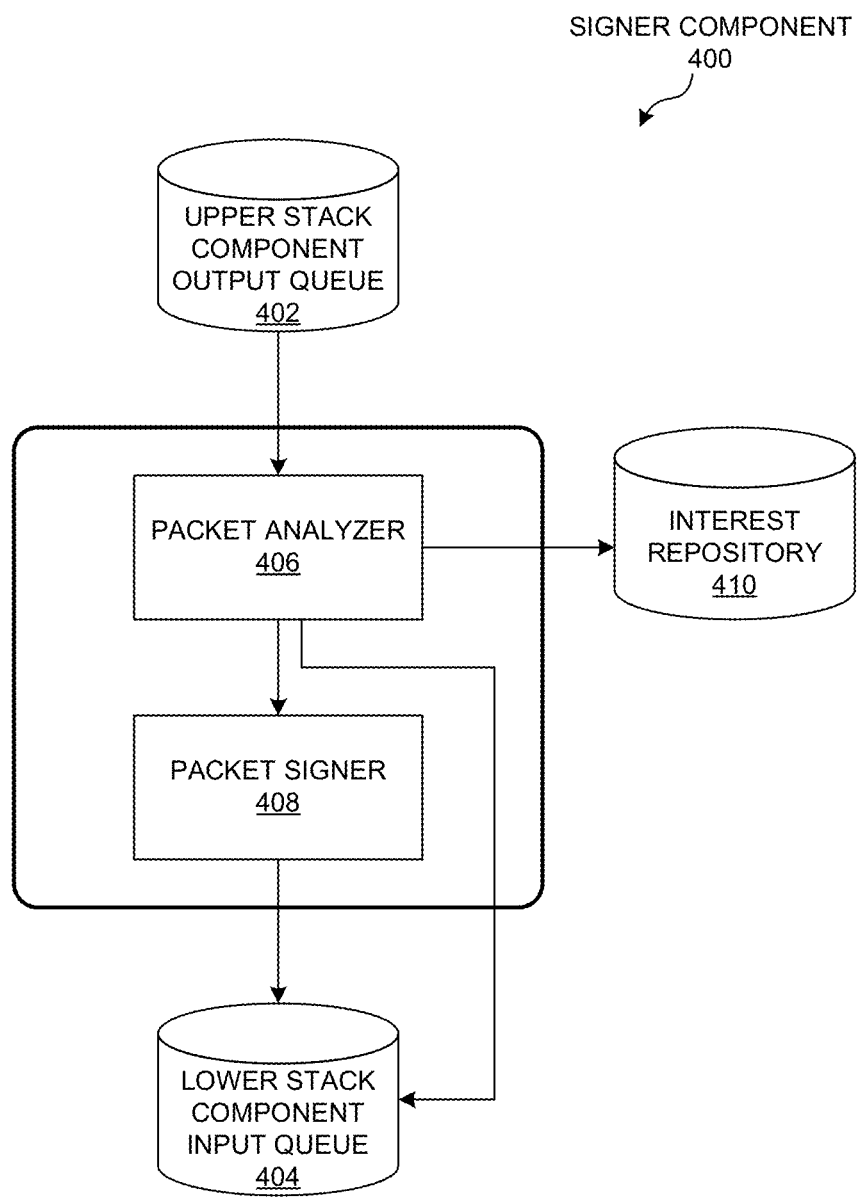
FIG. 4 illustrates an exemplary signer component of transport stack in accordance with an embodiment.

FIG. 4 illustrates an exemplary signer component 400 of transport stack in accordance with an embodiment. Signer component 400 can include a packet analyzer 406 and a packet signer 408. Moreover, signer component 400 can obtain messages from the security component's upper stack component output queue 402 (e.g., message outputs from the upper stack component). After processing an input message, signer component 400 forwards the output message to the security component's lower stack component input queue 404 (e.g., message inputs to the lower stack component).

Recall that the security component enforces trust management on pairs of Interests and Content Objects. For example, an ingress Content Object received by the verifier component needs to be associated with an egress Interest that was issued by an application. Because of this, packet analyzer 406 analyzes messages to detect Interests, and caches these Interests in an Interest repository 410 (e.g., a queue) as they flow through signer component 400. The verifier component can access Interest repository 410 to find a matching Interest to the Content Objects it receives.

In normal operation, Interest messages bypass packet signer 408. Hence, packet analyzer 406 forwards Interests to lower stack component input queue 404. On the other hand, when packet analyzer 406 detects a Content Object, packet analyzer 406 forwards the Content Object to packet signer 408 that signs the Content Object as it passes through signer component 400.

Figure 5:
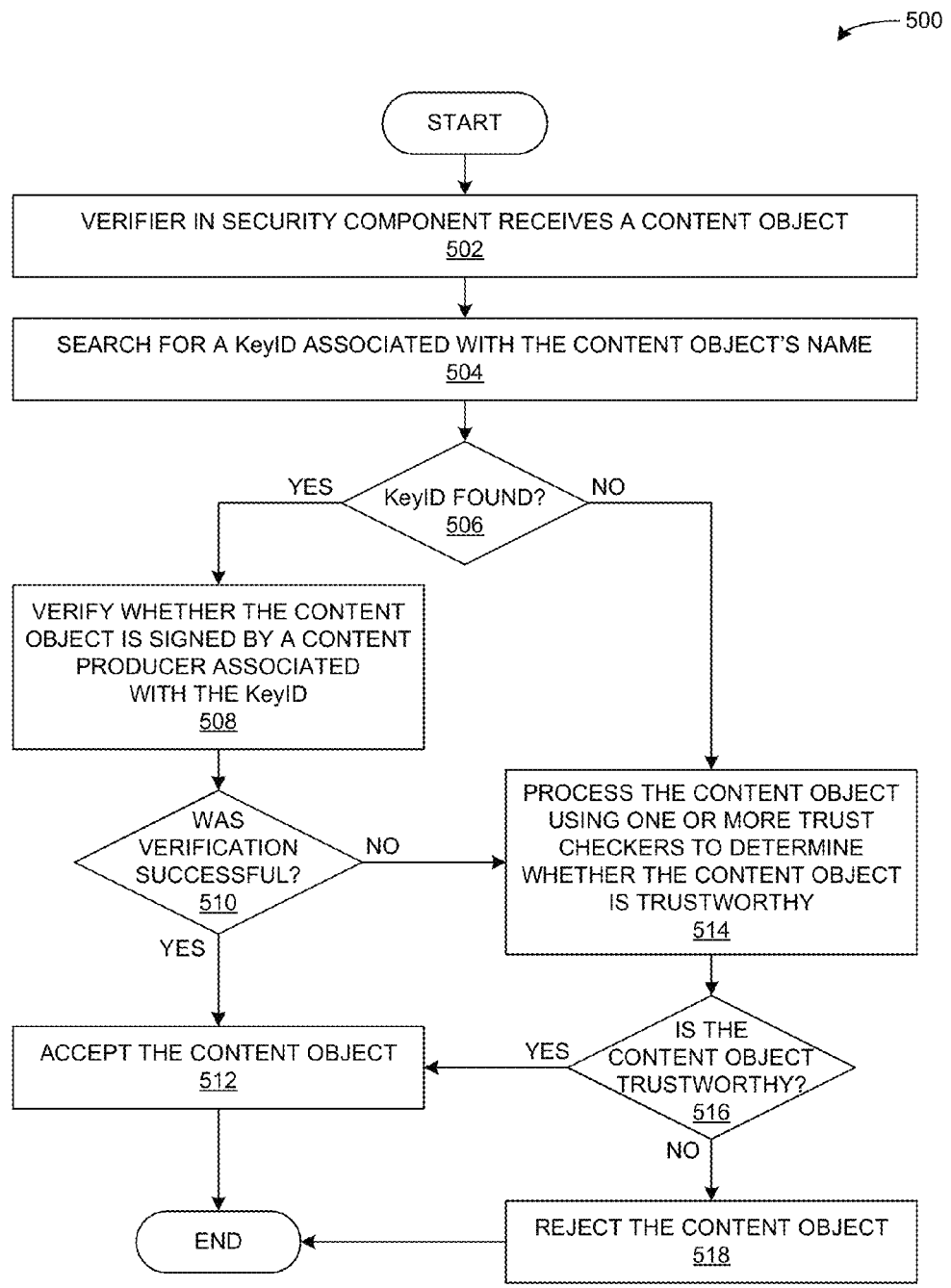
FIG. 5 presents a flow chart illustrating a method for verifying a Content Object received at a security component of a transport stack in accordance with an embodiment.

FIG. 5 presents a flow chart illustrating a method 500 for verifying a Content Object received at a security component of a transport stack in accordance with an embodiment. During operation, a verifier component of the security component can receive a Content Object (operation 502). The verifier processes the Content Object by searching a local repository for a KeyID associated with the Content Object's name (operation 504), and determining whether a KeyID was found (operation 506).

If a KeyID was found, the verifier component verifies whether the Content Object was signed by a content producer associated with the KeyID (operation 508). Also, if verification was successful, the verifier accepts the Content Object (operation 512), and proceeds to forward the verified Content Object to the application which disseminated the corresponding Interest (operation 514).

On the other hand, if a KeyID was not found (operation 506), or if verification was not conclusive (operation 510), the verifier can process the Content Object using one or more trust checkers to determine whether the Content Object is trustworthy (operation 514). Some example trust checks can include:

A trust checker that rejects stale data.
A trust checker that rejects Content Objects whose public key is obtained from a namespace not in a namespace whitelist or from a namespace in a namespace blacklist
A trust checker that validates Content Objects using a Pretty Good Privacy (PGP) peer web of trust.

The verifier then determines whether the trustworthy checks determined that the Content Object is trustworthy (operation 516). If the Content Object is trustworthy, the verifier accepts the Content Object and forwards the Content Object to the application (operation 512). Otherwise, the verifier rejects the Content Object (operation 518), and may perform a remedial action. The remedial action can include, for example, writing the failed verification operation in a log file, informing the application of the failed verification check (and providing the Content Object to the application), and storing the Content Object in a repository of rejected Content Objects.

Another remedial action may include blacklisting the content producer which returned the Content Object, and/or re-submitting the Interest to obtain another matching Content Object from another content producer. This allows the verifier component to initiate additional attempts at obtaining a verifiable Content Object on behalf of the application.

Figure 6:
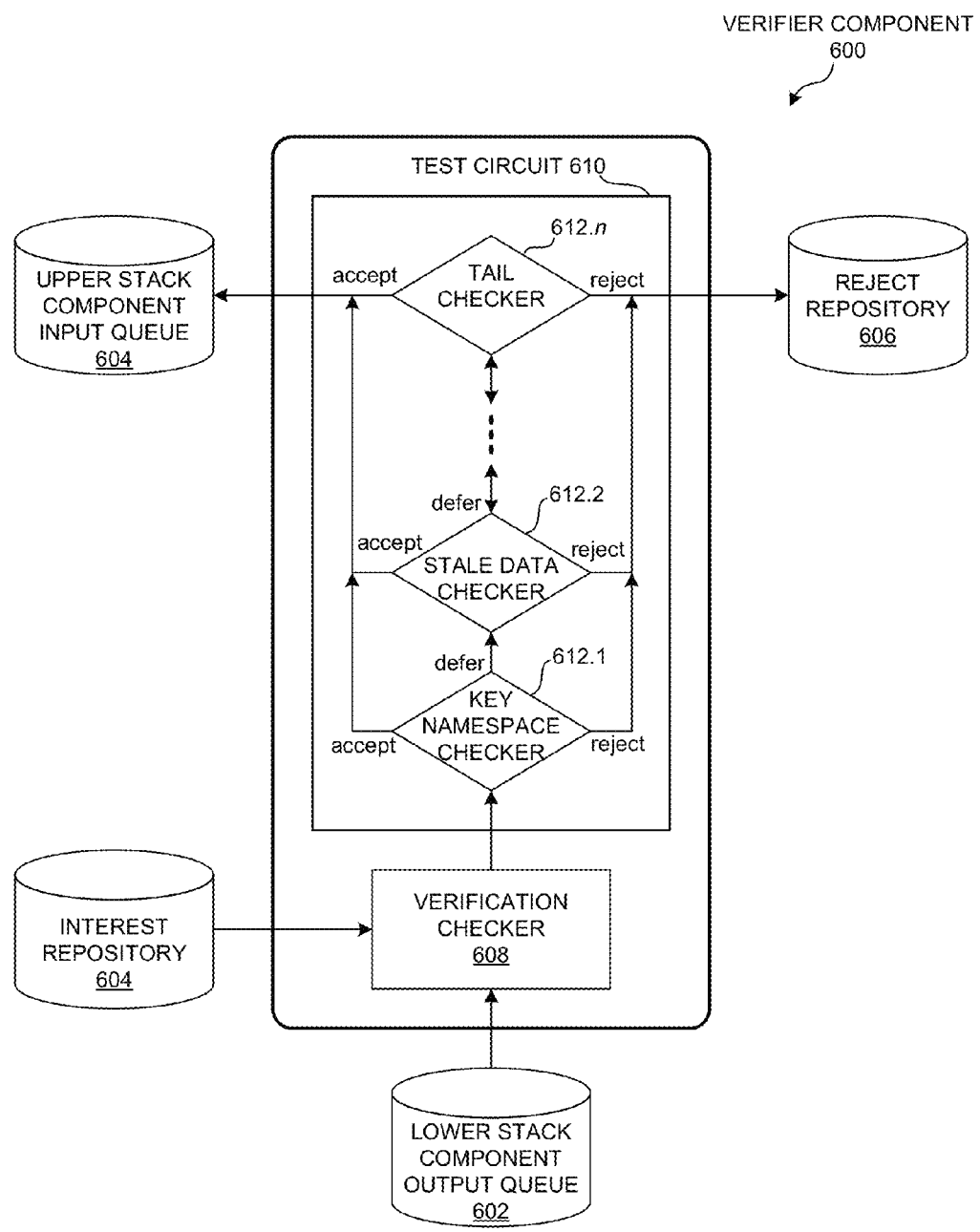
FIG. 6 illustrates an exemplary verifier component of a transport stack in accordance with an embodiment.

FIG. 6 illustrates an exemplary verifier component 600 of a transport stack in accordance with an embodiment. Verifier component 600 can include a verification checker 608 and a test circuit 610. Moreover, verifier component 600 can obtain messages from the security component's lower stack component output queue 402 (e.g., message outputs from the lower stack component). After verifying an input message, verifier component 600 forwards the accepted output message to the security component's upper stack component input queue 604 (e.g., message inputs to the upper stack component), and stores the rejected messages in a reject repository 606.

Recall that the security component enforces trust management on pairs of Interests and Content Objects. When verifier component 600 receives an ingress Content Object, verifier component 604 performs a lookup operation in an Interest repository 604 to search for the corresponding egress Interest message that was issued by a local application. Verification checker 608 uses the KeyID and the ContentObjectHash of the egress Interest message to verify the Content Object.

Test circuit 610 can perform advanced trust policy enforcement on the Content Objects, which involves processing the Content Object using one or more trust checkers 612.

For example, a key namespace checker 612.1 can check whether the public key used to verify the signature of a Content Object was generated by a key belonging to a trusted namespace. For example, content published under the "/pax" namespace can be signed by a key belonging to the "/xerox" namespace, such that the "/xerox" namespace is a whitelisted namespace to trust any keys published under the "/xerox" namespace.

In some embodiments, verification checker 608 can use a flat trust model, which is a special case of a hierarchical PKI trust model. Specifically, in the flat trust model, an application explicitly identifies the certificates of Content Objects the application trust. Verification checker 608 only accepts Content Objects signed using these identified certificates, and as a result, does not need to perform certificate chain traversal.

A stale data checker 612.2 can check whether the signature of a Content Object is not older than a predetermined time range, such as a week, month, a year, etc.

A tail checker 612.n can perform a preconfigured operation, such as to accept messages by default or reject messages by default. An application can configure the default operation via the CLI for verifier component 600.

A web of Trust (WOT) checker (not shown in FIG. 6) can maintain a cache of self-signed trusted identities (e.g., public key hashes), and uses this identities cache to enforce a web-of-trust model. Content Objects are deemed trusted if they are signed by a trusted key. When a new identity Content Object is received and passed into trust circuit 610, the WOT checker can check whether the verification key was signed by one of the already-trusted identities in the trusted identity cache. If so, the verification key is accepted and a reference count associated with the new identity is incremented. In some embodiments, the WOT checker can grow the set of trusted keys organically. For example, if a reference count for a new identity exceeds a predetermined threshold (e.g., three valid references), then the WOT checker can add this new identity to the trusted identity cache.

The web-of-trust model is a decentralized alternative to the more centralized PKI model. The fundamental idea of the web-of-trust model is that nodes can independently elect to trust an identity and public-key binding certificate without the presence of a trusted CA. More specifically, nodes can vouch for the trustworthiness of certificates individually or as a group. Nodes can either be partially trusted or fully trusted. Fully trusted nodes which vouch for a certificate binding automatically extend the "web of trust." Conversely, a group of nodes (e.g., three or more) must vouch for the same certificate binding before the "web of trust" is expanded.

For example, a movie streaming service running on CCN can categorize content hierarchically based on content type (e.g., movie, television), genre (e.g., action, comedy, romance), and year. To simplify key management, a hierarchy of keys for each name prefix may also be used. For example, the named data object (NDO) with name "/netflix/movie/action/2013/TheAvengers" may be signed by a key named "/netflix/movie/action/2013/key," which is in turn signed by a key named "/netflix/movie/action/key," and so on, up to the root key named "/netflix/key," which is signed by a trusted CA. With this type of trust model, the Content Object associated with the name "/netflix/movie/action/2013/TheAvengers" is trusted if the key chain from "/netflix/movie/action/2013/key" to "/netflix/key" is verified successfully.

To implement and enforce this particular trust model in CCN, an application developer would only be required to complete the following two steps:
1) Obtain public key of the CA which issued the trusted Netflix key offline via electronic distribution or online netflix via a KRS-like service.
2) Add this key to the trusted whitelist of the Verifier component via the CPI.

As a further optimization to avoid lengthy certificate chain traversal, the application developer could acquire and cache certificates associated with sub-namespaces within the Netflix naming hierarchy and add them to the trusted whitelist within the stack. For example, the certificates associated with the name prefix "/netflix/key," "/netflix/movie/key," and "/netflix/movie/action/key" could all be added in the trusted whitelist to circumvent certificate chain traversal for Content Objects belonging to the "/netflix/movie/action/" namespace.

As an alternate example, consider an application that implements a PGP-like web-of-trust model. As previously described, the set of trusted identities (e.g., public keys and self-signed certificates) expands in a user-based collaborative manner. Specifically, if more than three identities vouch for the trustworthiness of another previously untrusted identity, then the application can deem the identity to be trusted by consensus. In this example, we assume all identities are self-signed, which means that the organic growth of the set of trusted identities grows only by user group consensus.

To implement and abide by this particular type of trust model, an application developer need only instantiate verifier component 600 with a trust circuit 610 that contains a web-of-trust (WOT) checker. Then, the application can use the CPI to specify a preliminary set of trusted identities in the WOT checker. The WOT checker caches these trusted identities for future operation, which are each specified as hashes of their public keys.

Figure 7:
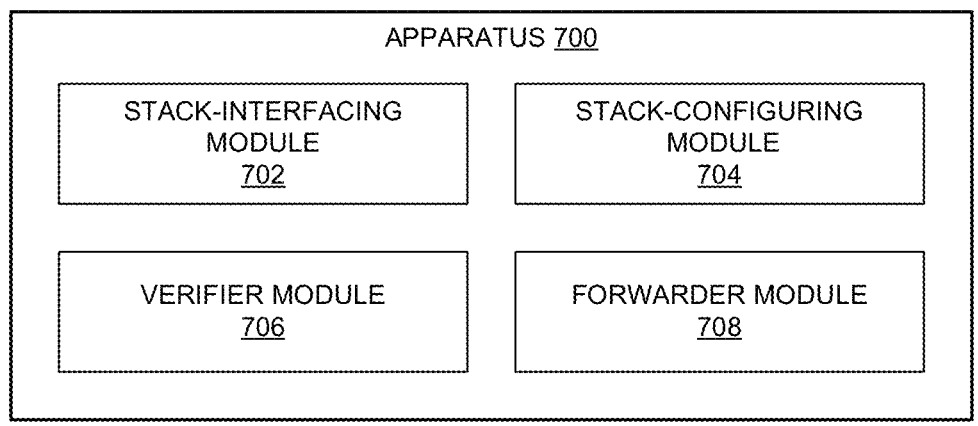
FIG. 7 illustrates an exemplary apparatus that facilitates receiving verified Content Objects in accordance with an embodiment.

FIG. 7 illustrates an exemplary apparatus 700 that facilitates receiving verified Content Objects in accordance with an embodiment. Apparatus 700 can comprise a plurality of modules which may communicate with one another via a wired or wireless communication channel. Apparatus 700 may be realized using one or more integrated circuits, and may include fewer or more modules than those shown in FIG. 7. Further, apparatus 700 may be integrated in a computer system, or realized as a separate device which is capable of communicating with other computer systems and/or devices. Specifically, apparatus 700 can comprise a stack-interfacing module 702, a stack-configuring module 704, a verifier module 706, and a forwarder module 708.

In some embodiments, stack-interfacing module 702 can obtain a stack requirement for a custom stack, and can forward packets between an application and the custom stack. Stack-configuring module 704 can instantiate or configure a stack to satisfy the stack requirements.

Verifier module 706 can process a Content Object for the custom stack to verify whether the Content Object is signed by the content producer associated with a given KeyID. Forwarder module 708 can forward CCN Messages between a local stack and a computer network (e.g., a content centric network).

Figure 8:
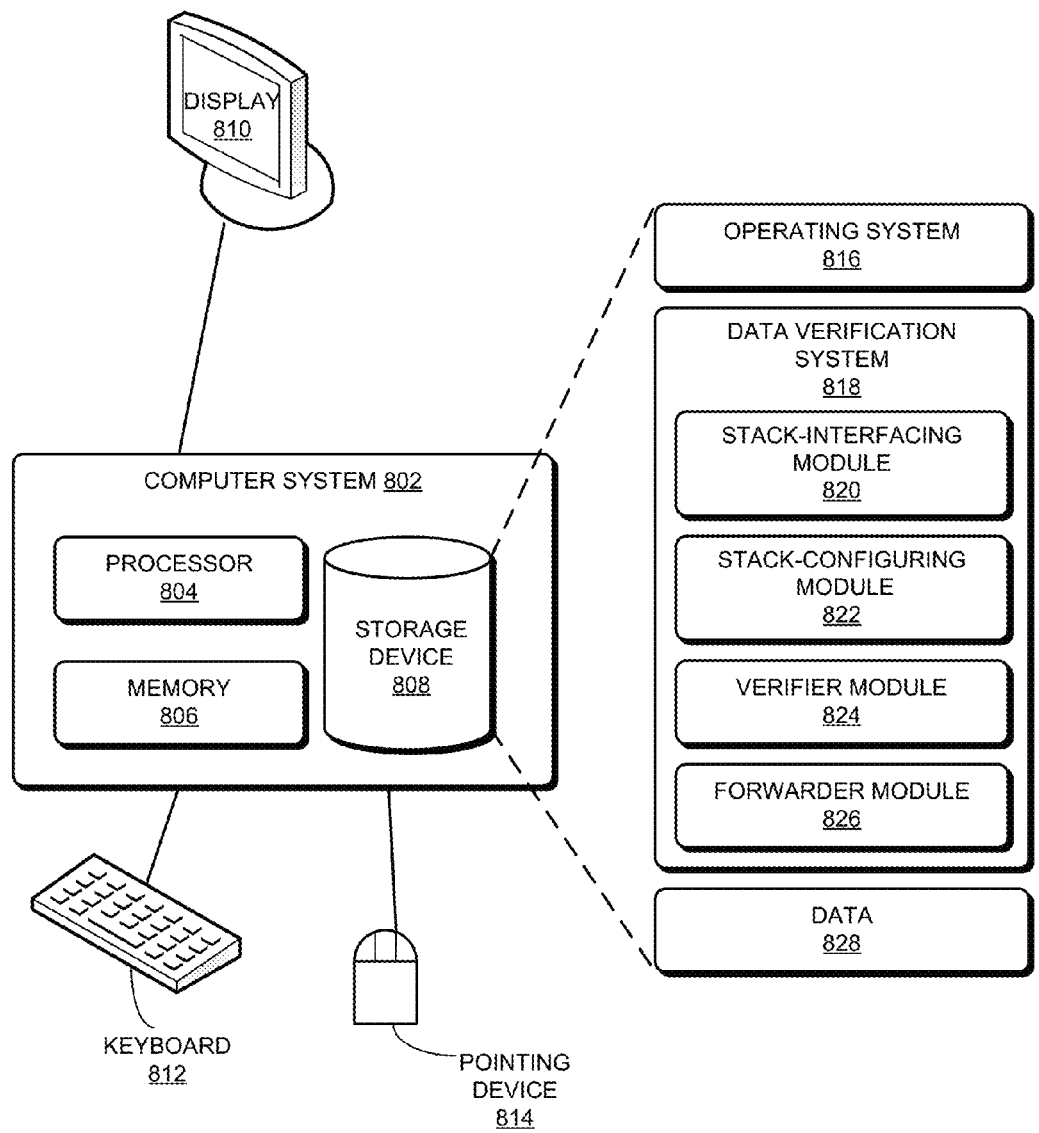
FIG. 8 illustrates an exemplary computer system that facilitates receiving verified Content Objects in accordance with an embodiment.

FIG. 8 illustrates an exemplary computer system 802 that facilitates receiving verified Content Objects in accordance with an embodiment. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store operating system 816, a data verification system 818, and data 828.

Data verification system 818 can include instructions, which when executed by computer system 802, can cause computer system 802 to perform methods and/or processes described in this disclosure. Specifically, data verification system 818 may include instructions for obtaining a stack requirement for a custom stack, and for forwarding packets between an application and the custom stack (stack-interfacing module 820). Further, data verification system 818 can include instructions for instantiating or configuring a stack to satisfy the stack requirements (stack-configuring module 822).

Data verification system 818 can include instructions for processing a Content Object for the custom stack to verify whether the Content Object is signed by the content producer associated with a given KeyID (verifier module 824). Data verification system 818 can also include instructions for forwarding CCN Messages between a local stack and a computer network (e.g., a content centric network) (forwarder module 826).

Data 828 can include any data that is required as input or that is generated as output by the methods and/or processes described in this disclosure.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
    obtaining a stack requirement for a custom stack, wherein the stack requirement specifies at least a description for a verifier stack component which verifies a Content Object using a key identifier associated with a content producer, wherein the custom stack is configured by a transport framework based on specific requirements of an application, and wherein the description for the verifier component includes one or more of:
        a listing of one or more trust checkers to instantiate in the verifier stack component, wherein a respective trust checker analyzes the Content Object to accept the Content Object, reject the Content Object, or defer verification of the Content Object to another trust checker;
        an ordering for the one or more trust checkers in the verifier stack component; and
        an implementation for the respective trust checker;
    instantiating the verifier stack component in the custom stack; and
    using the custom stack to obtain a verified Content Object, which involves:
        pushing, to the custom stack, an Interest that includes a name for a piece of content and includes the key identifier associated with the content producer; and
        receiving, from the custom stack, the Content Object which the verifier stack component has verified is signed by the content producer associated with the key identifier,
    thereby facilitating the custom stack to verify the Content Object on behalf of the application without requiring the application to be involved in verifying the Content Object.

2. The method of claim 1, further comprising processing the Content Object using the verifier stack component of the custom stack, wherein processing the Content Object involves:
    using a verifier module to verify whether the Content Object is signed by the content producer associated with the key identifier; and
    responsive to determining that the verifier module does not validate or invalidate the Content Object, processing the Content Object using one or more trust checkers to determine whether the Content Object is trustworthy.

3. The method of claim 2, further comprising:
    accepting the Content Object responsive to determining that at least one trust checker has determined the Content Object to be trustworthy.

4. The method of claim 2, further comprising:
    rejecting the Content Object responsive to determining that at least one trust checker has determined the Content Object to not be trustworthy.

5. The method of claim 1, wherein the description of the verifier stack component includes a list of trusted certificate authorities.

6. The method of claim 1, wherein the set of trust checkers includes one or more of:
    a trust checker that rejects Content Objects with stale data;
    a trust checker that rejects a public key which is not published under a white-list name prefix; and
    a trust checker which verifies the Content Object using a Pretty Good Privacy (PGP) web of trust.

7. The method of claim 1, further comprising:
receiving, from the application, a control statement for the custom stack, wherein the control statement includes a set of trust checkers to enable in the verifier stack component; and
enabling the set of trust checkers.

8. The method of claim 1, further comprising:
receiving, from the application, a control statement for the custom stack, wherein the control statement includes a set of trust checkers to disable in the verifier stack component; and
disabling the set of trust checkers.

9. A non-transitory computer-readable storage medium storing instructions that when executed by a computer cause the computer to perform a method, comprising:
obtaining a stack requirement for a custom stack, wherein the stack requirement specifies at least a description for a verifier stack component which verifies a Content Object using a key identifier associated with a content producer, wherein the custom stack is configured by a transport framework based on specific requirements of an application, and wherein the description for the verifier component includes one or more of:
a listing of one or more trust checkers to instantiate in the verifier stack component, wherein a respective trust checker analyzes the Content Object to accept the Content Object, reject the Content Object, or defer verification of the Content Object to another trust checker;
an ordering for the one or more trust checkers in the verifier stack component; and
an implementation for the respective trust checker;
instantiating the verifier stack component in the custom stack; and using the custom stack to obtain a verified Content Object, which involves:
pushing, to the custom stack, an Interest that includes a name for a piece of content and includes a the key identifier associated with the content producer; and
receiving, from the custom stack, the Content Object which the verifier stack component has verified is signed by the content producer associated with the key identifier,
thereby facilitating the custom stack to verify the content object on behalf of the application without requiring the application to be involved in verifying the content object.

10. The storage medium of claim 9, wherein the method further comprises processing the Content Object using the verifier stack component of the custom stack, wherein processing the Content Object involves:
using a verifier module to verify whether the Content Object is signed by the content producer associated with the key identifier; and
responsive to determining that the verifier module does not validate or invalidate the Content Object, processing the Content Object using one or more trust checkers to determine whether the Content Object is trustworthy.

11. The storage medium of claim 10, wherein the method further comprises:
accepting the Content Object responsive to determining that at least one trust checker has determined the Content Object to be trustworthy.

12. The storage medium of claim 10, wherein the method further comprises:
rejecting the Content Object responsive to determining that at least one trust checker has determined the Content Object to not be trustworthy.

13. The storage medium of claim 9, wherein the description of the verifier stack component includes a list of trusted certificate authorities.

14. The storage medium of claim 9, wherein the set of trust checkers includes one or more of:
a trust checker that rejects Content Objects with stale data;
a trust checker that rejects a public key which is not published under a white-list name prefix; and
a trust checker which verifies the Content Object using a Pretty Good Privacy (PGP) web of trust.

15. The storage medium of claim 9, wherein the method further comprises:
receiving, from the application, a control statement for the custom stack, wherein the control statement includes a set of trust checkers to enable or disable in the verifier stack component; and
enabling or disabling the set of trust checkers.

16. A computer system comprising:
a processor; and
a storage device storing instructions that when executed by the processor cause the processor to perform a method, the method comprising:
obtaining a stack requirement for a custom stack, wherein the stack requirement specifies at least a description for a verifier stack component which verifies a Content Object using a key identifier associated with a content producer, wherein the custom stack is configured by a transport framework based on specific requirements of an application, and wherein the description for the verifier component includes one or more of:
a listing of one or more trust checkers to instantiate in the verifier stack component, wherein a respective trust checker analyzes the Content Object to accept the Content Object, reject the Content Object, or defer verification of the Content Object to another trust checker;
an ordering for the one or more trust checkers in the verifier stack component; and
an implementation for the respective trust checker; and
instantiating the verifier stack component in the custom stack; and
using the custom stack to obtain a verified Content Object, which involves:
pushing, to the custom stack, an Interest that includes a name for a piece of content and includes a the key identifier associated with the content producer; and
receiving, from the custom stack, the Content Object which the verifier stack component has verified is signed by the content producer associated with the key identifier,
thereby facilitating the custom stack to verify the Content Object on behalf of the application without requiring the application to be involved in verifying the Content Object.

17. The computer system of claim 16, further comprising processing the Content Object for the custom stack, wherein processing the Content Object involves:
verifying whether the Content Object is signed by the content producer associated with the key identifier; and
responsive to determining that the Content Object is not validated or invalidated, processing the Content Object using one or more trust checkers to determine whether the Content Object is trustworthy.

18. The computer system of claim 17, wherein the method further comprises accepting the Content Object responsive to determining that at least one trust checker has determined the Content Object to be trustworthy.

19. The computer system of claim 17, wherein the method further comprises rejecting the Content Object responsive to determining that at least one trust checker has determined the Content Object to not be trustworthy.

20. The computer system of claim 16, wherein the description of the verifier stack component includes a list of trusted certificate authorities.

21. The computer system of claim 16, wherein the set of trust checkers includes one or more of:
- a trust checker that rejects Content Objects with stale data;
- a trust checker that rejects a public key which is not published under a white-list name prefix; and
- a trust checker which verifies the Content Object using a Pretty Good Privacy (PGP) web of trust.

22. The computer system of claim 16, wherein the method further comprises:
receiving, from the application, a control statement that includes a set of trust checkers to enable or disable in the verifier stack component; and
enabling or disabling the set of trust checkers.

* * * * *